United States Patent [19]

Greber et al.

[11] Patent Number: 5,164,476

[45] Date of Patent: Nov. 17, 1992

[54] SOLUBLE AND/OR FUSIBLE POLYIMIDES AND POLYAMIDOIMIDES

[75] Inventors: Gerd Greber, Bad Vöslau; Heinrich Gruber; Marcel Sychra, both of Vienna, all of Austria

[73] Assignee: Chemie Linz Gesellschaft m.b.H., Linz, Austria

[21] Appl. No.: 466,433

[22] PCT Filed: Nov. 10, 1988

[86] PCT No.: PCT/EP88/01019

§ 371 Date: Jun. 12, 1990

§ 102(e) Date: Jun. 12, 1990

[87] PCT Pub. No.: WO89/04336

PCT Pub. Date: May 18, 1989

[30] Foreign Application Priority Data

Nov. 12, 1987 [DE] Fed. Rep. of Germany ....... 3738457

[51] Int. Cl.$^5$ ..................... C08G 73/14; C08G 69/12; C08G 69/26
[52] U.S. Cl. ................... 528/352; 528/176; 528/179; 528/183; 528/188; 528/222; 528/226; 528/229; 528/338; 528/339; 528/340; 528/348; 528/350; 528/353
[58] Field of Search ............... 528/176, 179, 183, 188, 528/222, , 226, 229, 338, 339, 340, 348, 350, 352, 353

[56] References Cited

U.S. PATENT DOCUMENTS

| | | | |
|---|---|---|---|
| 3,595,064 | 7/1975 | Brode et al. | 73/37 |
| 3,766,138 | 10/1973 | Crivello | 528/387 |
| 3,933,749 | 1/1976 | Williams | 528/188 |
| 4,526,838 | 7/1985 | Fujioka et al. | 528/322 |
| 4,621,134 | 11/1986 | Aritomi et al. | 528/337 |
| 4,721,257 | 2/1988 | Aritomi et al. | 528/352 |

FOREIGN PATENT DOCUMENTS

| | | |
|---|---|---|
| 245815 | 11/1987 | European Pat. Off. . |
| 3738456 | 5/1989 | Fed. Rep. of Germany . |
| 60-166326 | 8/1985 | Japan . |
| 62-15228 | 1/1986 | Japan . |
| 61-141731 | 6/1986 | Japan . |

OTHER PUBLICATIONS

K. Bühler, "Spezialplaste", [Special-Purpose Plastics], Akademie Ver Lag, Berlin 1978, pp. 357, 600.
CA 108: 151177n, Greber et al.; CA 112: 57042a, Ikeda et al.
CA 111: 215122n, Greber et al.; CA 113: 7030v, Greber et al.
CA 110: 115755g, Koton et al.
CA 111: 58573r, Tsuyoshi et al.
CA 112; 57393r, Koton et al.
CA 111: 205228n, Chien.
*Hochmolekularbericht* III–08 (1986) ref. JP 60–166326.
*Hochmolekularbericht* III–08 (1987) ref. JP 61–141731.
Skroog et al., *J. Polym. Sci.*, A3 1373–1390 (1965).
Srna et al., *Chem. Abstr.*, 76 Col. 15842u (1972).

*Primary Examiner*—John Kight, III
*Assistant Examiner*—P. Hampton-Hightower
*Attorney, Agent, or Firm*—Wenderoth, Lind & Ponack

[57] ABSTRACT

Soluble and/or fusible polyimides or polyamidoimides of the general formula I

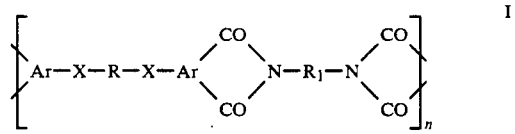

in which R denotes a divalent radical of the formula II

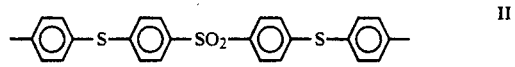

Ar denotes trivalent or tetravalent aromatic radicals or mixtures thereof, X denotes the amide radical, if Ar is trivalent, and if Ar is tetravalent denotes the imide radical and R$_1$ denotes divalent aromatic radicals, and a process for their preparation.

7 Claims, No Drawings

SOLUBLE AND/OR FUSIBLE POLYIMIDES AND POLYAMIDOIMIDES

DESCRIPTION

The invention describes soluble and/or fusible heat-stable polyimides and polyamidoimides and processes for their preparation.

The heat-stable polymers which are the most important industrially to date are the completely aromatic polyimides, which have extreme heat stabilities but are neither fusible nor soluble and therefore can be processed only with much effort and expensively. The somewhat less heat-stable aromatic polyamides are also non-fusible and insoluble or only slightly soluble in most organic solvents, so that their processing to fibers or films from solution is associated with great difficulties. The difficult processability makes these heat-stable polymers quite considerably more expensive and therefore excludes them from a number of interesting uses.

Attempts to develop fusible or more readily soluble heat-stable polymers—for example by incorporation flexible chain elements (—CH$_2$—, —O—, —S— or —CO—) or sterically hindering groups have indeed been successful, but to date have always led to a usually considerable loss of heat stability. These products also include the polyamidoimides and polyester-imides in which aromatic amide and imide or ester and imide groups are arranged randomly, these usually being soluble or having thermoplastic properties but likewise having a low heat stability (U.S. Pat. No. 3,895,064).

The actual solution to the problem in the field of heat-stable polymers thus still lies in the development of novel products of high heat stability and at the same time good processability.

The object of the present invention was to develop novel polyimides and polyamidoimides which, as well as having an extreme heat stability, are soluble and/or fusible in the cyclized form and thus can easily be processed by conventional methods.

It has now been found that this object can be achieved with the aid of polyimides or polyamidoimides which contain aromatic tri- or tetracarboxylic acid radicals and the radicals of at least two different diamines as chain units, at least one of which consists of benzene rings bonded via —S— and —SO$_2$— bridges.

The present invention accordingly relates to soluble and/or fusible polyimides or polyamidoimides of the general formula I

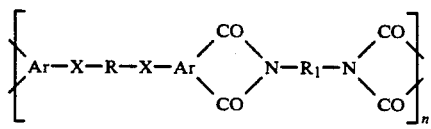

in which R denotes a divalent radical of the formula II

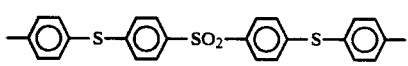

Ar denotes trivalent or tetravalent aromatic radicals which are optionally substituted by one or more halogen atoms, or mixtures thereof, it being possible for the trivalent aromatic radical optionally additionally to contain a carboxyl group as a substituent, X denotes the amide radical —CO—NH— if Ar is trivalent, and if Ar is tetravalent denotes the imide radical of the formula III

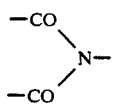

N in each case being bonded to R, R$_1$ denotes divalent aromatic radicals of the formulae IV to VIII

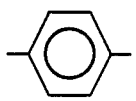

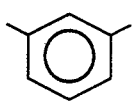

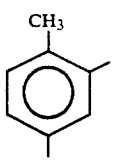

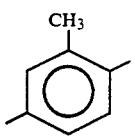

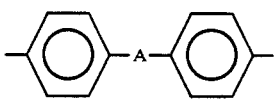

or mixtures thereof, in which A stands for —CH$_2$—, —C(CH$_3$)$_2$—, —O—, —S—, —SO—, —SO$_2$—, —CO—, —COO—, —CO—NH—, —NH—, —(-N—alkyl)— having 1 to 20 C atoms, —(N—aryl)— having 6 to 20 C atoms or —N=N—, and n denotes an integer from 2 to 200.

All the known tri- or tetravalent aromatic radicals Ar which are derived, in particular, from the corresponding tri- or tetracarboxylic acids or their derivatives, such as, for example, anhydrides, esters or acid chlorides, are possible according to the invention. Examples of these are radicals of aromatics, fused aromatics and heteroaromatics and derivatives thereof. Preferred tri- or tetravalent radicals Ar are the benzene radical or the benzophenone radical. Those polyamidoimides of the general formula I

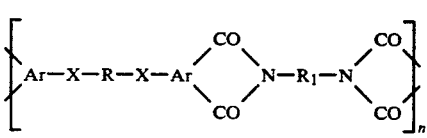

which contain both trivalent and tetravalent radicals Ar are furthermore preferred. The radicals Ar can also be substituted.

If the trivalent radical Ar additionally contains a carboxyl group as a substituent, that is to say is derived from a tetracarboxylic acid, the polymer according to the invention is in the form of an amide acid which contains a carboxyl group in the ortho-position relative to the amide bond.

The polyimides or polyamidoimides of the general formula I according to the invention

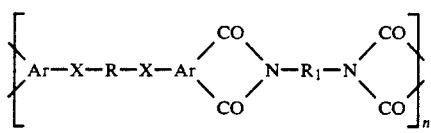

can be prepared by reacting tetracarboxylic acids or derivatives thereof of the general formula IX

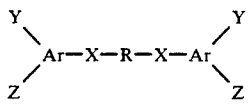

in which R, Ar and X have the abovementioned meaning and Y and Z either together denote the anhydride radical —CO—O—CO— or by themselves and independently of one another denote the radicals —COOH, —COCl or —COOR$_2$, in which R$_2$ stands for an alkyl radical having 1 to 20 C atoms or for an aryl radical having 6 to 20 C atoms, with aromatic diamines of the general formula X

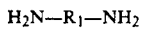

in which R$_1$ has the abovementioned meaning, in a manner which is known per se and the polyamide acids initially formed are subjected to cyclization chemically or by means of heat.

The polyimides or polyamidoimides according to the invention are preferably prepared in a manner which is known per se in strongly polar solvents, such as, for example, dimethylformamide (DMF), dimethylacetamide (DMA), N-methylpyrrolidone (NMP), dimethyl sulfoxide (DMSO), tetramethylurea or hexamethylphosphoric acid triamide, at reaction temperatures of $-30°$ to $+30°$ C. (J.Polym.Sci., A3 (1965) 1373–1390). The initially resulting solutions of the polyamide ac ds or polyamidoamide acids have intrinsic viscosities of 0.1 to 4.0 dl/g (0.5%, 25° C.). The viscosities achieved depend above all on the purity of the components used. High viscosities can be achieved, for example, by using very pure starting products or by subsequent addition of very small amounts of one of the two partners.

The polyamide acid or polyamidoamide acid solutions can be converted in a known manner into films and fibers and can then be cyclized to polyimides or polyamidoimides, for example by means of heat under dehydration, temperatures up to about 300° C. possibly being necessary at the end for quantitative cyclization. In principle, such solutions can also be used for lamination, but the water split off causes trouble so that the great advantage of the polyimides and polyamidoimides according to the invention of also still being readily soluble in polar solvents in the cyclized form is advantageously utilized here.

On the other hand, if the polyimides or polyamidoimides are to be isolated in powder form, for example as a pressing powder for thermoplastic shaping, the cyclization is carried out, for example, chemically with the aid of agents which take up water, such as, for example, acetic anhydride, if appropriate in the presence of pyridine or other bases. The polyimides or polyamidoimides thus obtained can now either be shaped as thermoplastics under pressure or dissolved in polar solvents. Films, fibers and laminates can be produced from such solutions, the great advantage being that ready-cyclized polyimides and polyamidoimides are already present after removal of the solvent, that is to say, for example, no further water has to be split off, which is of great importance especially for laminations.

The polyimides and polyamidoimides according to the invention are soluble in concentrations of up to about 20% by weight in the completely cyclized form in polar solvents, such as, for example, dimethylformamide, dimethylacetamide, N-methylpyrrolidone and the like. They have glass transition points of between 245° and 285° C. and can be thermoplastically shaped under pressure.

The heat stabilities of the polyimides and polyamidoimides according to the invention are up to 545° C., measured in air by means of thermogravimetric analysis (TGA) at a heating up rate of 10° C./minute (5% weight loss).

In addition to these excellent heat stabilities, the polyimides and polyamidoimides according to the invention also have very good mechanical properties (tensile strengths of about 60 to 120 MPa, E modulus of about 1,800 to about 3,300 MPa, elongations at break of about 3 to about 13%) and electrical properties (dielectric loss factors of about 0.001 to about 0.008), and thus belong to the high performance materials.

In order to prepare polyimides or polyamidoimides with controlled properties, for example a certain glass transition point, it is also possible to use mixtures of different tetracarboxylic acids or their derivatives of the general formula IX and mixtures of different diamines of the general formula X.

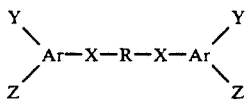

The tetracarboxylic acids and their derivatives of the general formula IX

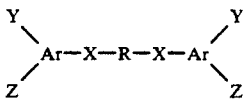

are described in DE 3,738,456, filed at the same time. They can be prepared, for example, by reaction of known tri- or tetracarboxylic acids or derivatives thereof with the diamine of the formula XI

wherein R has the above meaning, in strongly polar solvents and can subsequently be isolated from the reaction solution.

Instead of using the isolated tetracarboxylic acids or derivatives thereof of the general formula IX

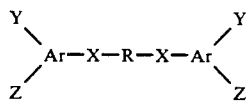

these can also preferably be reacted with aromatic diamines of the general formula X

   X directly after their synthesis, in which stoichiometric amounts of the starting substances are preferably used, without being isolated from the reaction mixture.

Preferred tetracarboxylic acid derivatives of the general formula IX which are reacted according to the invention with the diamines of the general formula X are the tetracarboxylic acid dianhydrides of the general formula IX

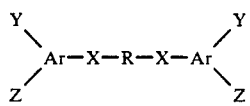

In the case of the reaction of tetracarboxylic acids or anhydrides thereof of the general formula IX with the diamines of the general formula X

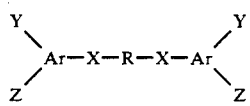

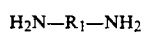   X water is split off during the cyclization of the polyamide acids initially formed to the polyimides or polyamidoimides of the general formula I according to the invention

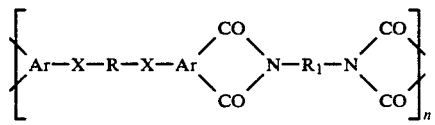

In the case of the reaction of the corresponding tetracarboxylic acid chlorides, tetracarboxylic acid esters or mixed tetracarboxylic acid ester-chlorides of the general formula IX

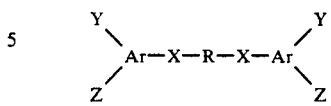

HCl, alcohol or a hydroxyaromatic, for example phenol, is split off during the cyclization.

Possible aromatic diamines of the general formula X

   X are also compounds in which $R_1$ represents one or more aromatic radicals which are bonded to one another directly or via bridge members and are optionally further substituted, for example by alkyl or alkoxy groups or by halogen atoms.

The diamine of the formula XI

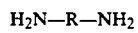   XI is prepared, for example, in accordance with EP-A-0,245,815 by reaction of the Na salt of bis-(4-mercaptophenyl)diphenyl sulfone with excess 4-chloronitrobenzene to give 1,4-bis(4-nitrophenylthio)diphenyl sulfone and subsequent reduction of the nitro groups.

The preparation of the novel polyimides and polyamidoimides is illustrated in more detail in the following examples, novel tetracarboxylic acid dianhydrides of the general formulae XII, XIII and XIV having been reacted with various diamines of the general formula X

   X

When the dianhydride of the formula XII

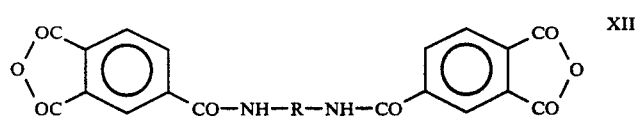

was used, polyamidoamide acids were obtained which were then cyclized to polyamidoimides (Examples 1 to 4). When the dianhydride of the formula XIII and XIV

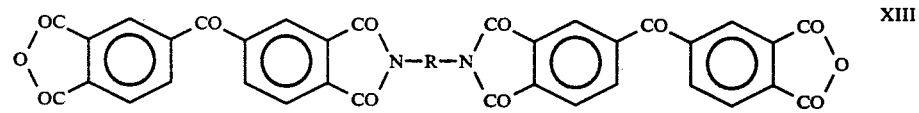

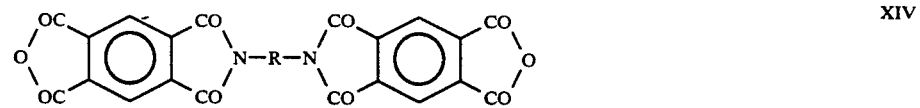

was used, polyamide acids were obtained and were cyclized to polyimides (Examples 5,6,7,13 and 14). In Examples 8 to 12, a dianhydride of benzophenonetetracarboxylic acid dianhydride (BTDA) and 1,4-bis(4-aminophenylthio)diphenyl sulfone was prepared and was reacted directly with various diamines of the general formula X

in the reaction mixture, without being isolated, polyamide acids being obtained, which were then cyclized to the corresponding polyimides.

EXAMPLES

Preparation of the tetracarboxylic acid dianhydrides a) Preparation of the dianhydride of the formula XII (dianhydride XII)

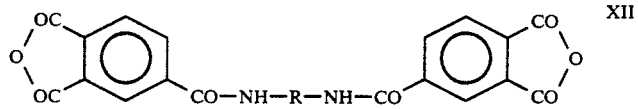

Batch:
10.85 g (0.05 mol) of trimellitic acid anhydride-chloride (TMACl)
9.30 g (0.02 mol) of 1,4-bis(4-aminophenylthio)diphenyl sulfone (BDS)
90 ml of absolute N-methyl-2-pyrrolidone (NMP)

The apparatus consists of a 250 ml three-necked flask with a mechanical stirrer, thermometer, dropping funnel with a drying tube and nitrogen inlet tube and is heated in a flame in a dry stream of nitrogen. The TMACl is dissolved in 25 ml of NMP, the solution is cooled to $-40°$ C. with dry ice/acetone and the BDS in 65 ml of NMP is added dropwise at this temperature in the course of 30 minutes. After a further 30 minutes at $-40°$ C., the reaction mixture is slowly heated to room temperature and is then stirred for a further 3 hours. The resulting viscous solution is added dropwise to 500 ml of absolute benzene at 10° C., while excluding atmospheric moisture and while stirring, until after about 1 hour a pale yellow precipitate separates out, which is filtered off, washed with cold and hot absolute benzene and then dried at 60° C. in a vacuum drying cabinet. The crude product is recrystallized from absolute acetic anhydride.

Yield: 14.7 g (90% of theory), melting point: 282°-288° C.

| Analysis: | calculated (%) | found (%) |
|---|---|---|
| $C_{42}$ | 62.05 | 61.62 |
| $H_{24}$ | 2.98 | 3.16 |
| $N_2$ | 3.45 | 3.56 |
| $S_3$ | 11.83 | 12.24 |
| $O_{10}$ | — | — | b) Preparation of the dianhydride of the formula XIII (dianhydride XIII)

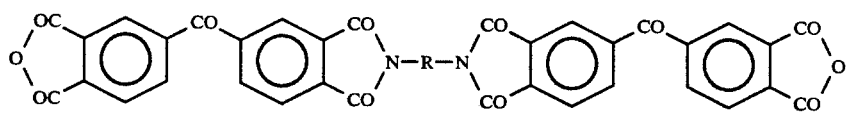

Batch:
6.4446 g (0.02 mol) of benzophenonetetracarboxylic acid dianhydride (BTDA)
4.6464 g (0.01 mol) of 1,4-bis(4-aminophenylthio)-diphenyl sulfone (BDS)
3.6 g (0.035 mol) of acetic anhydride
60 ml of absolute dimethylacetamide (DMA)

The BTDA is dissolved in 25 ml of DMA in a dry apparatus consisting of a 100 ml three-necked flask, magnetic stirrer, reflux condenser, dropping funnel, nitrogen inlet tube, thermometer and drying tube. The BDS, dissolved in 35 ml of DMA, is added dropwise at room temperature in the course of 15 minutes and the reaction mixture is heated to 90° C. After 30 minutes, 3.6 g of acetic anhydride are added and the temperature is increased to 125° C. for 1 hour. The dark brown solution is evaporated on a rotary evaporator and the residue is recrystallized from absolute acetic anhydride and then dried in a vacuum drying cabinet at 90° C.

Yield: 9.5 g (88% of theory), melting point 238°-242°C.

| Analysis: | calculated (%) | found (%) |
|---|---|---|
| $C_{58}$ | 64.92 | 64.37 |
| $H_{28}$ | 2.64 | 2.92 |
| $N_2$ | 2.61 | 2.39 |
| $S_3$ | 8.96 | 8.76 |
| $O_{14}$ | — | — | c) Preparation of the dianhydride of the formula XIV (dianhydride XIV)

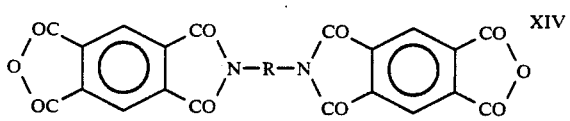

Batch:
9.597 g (0.044 mol) of pyromellitic acid dianhydride (PMDA)
9.293 g (0.02 mol) of 1,4-bis(4-aminophenylthio)-diphenyl sulfone (BDS)
7.2 g (0.07 mol) of absolute acetic anhydride
100 ml of absolute DMA The PMDA is dissolved in 35 ml of DMA in a dry apparatus consisting of a 250 ml three-necked flask, magnetic stirrer, reflux condenser, dropping funnel, nitrogen inlet tube, thermometer and drying tube. The BDS is dissolved in 65 ml of DMA, the solution is added dropwise at room temperature in the course of 15 minutes and the reaction mixture is heated to 90° C. After 30 minutes, 7.2 g of acetic anhydride are added and the temperature is increased to 125° C. for 1 hour. The resulting viscous solution is added dropwise to 500 ml of absolute benzene at 10° C., while excluding atmospheric moisture and while stirring, and the yellow precipitate which has separated out is filtered off, washed with cold and hot absolute benzene and then dried at 60° C. in a vacuum drying cabinet. The crude product is recrystallized from absolute acetic anhydride.

Yield: 14.4 g (83% of theory), melting point: 256°–261° C.

| Analysis: | calculated (%) | found (%) |
|---|---|---|
| $C_{44}$ | 61.11 | 60.83 |
| $H_{20}$ | 2.33 | 2.57 |
| $N_2$ | 3.24 | 3.03 |
| $S_3$ | 11.12 | 10.98 |
| $O_{12}$ | — | — |

EXAMPLE 1 a) Preparation of a polyamidoamide acid from the dianhydride XII and 4,4'-methylenedianiline (MDA)

Batch:
2.0322 g (2.5 mmol) of dianhydride XII
0.4957 g (2.5 mmol) of MDA
20 ml of absolute N-methylpyrrolidone (NMP)

The apparatus consists of a 50 ml three-necked flask, dropping funnel with a drying tube, magnetic stirrer and nitrogen inlet tube and was flamed in a dry stream of nitrogen. The MDA was taken in 5 ml of NMP and the solution was cooled to 0° C. The dianhydride XII, dissolved in 15 ml of NMP, was then added dropwise to the diamine solution in the course of 10 minutes and the reaction mixture was stirred at room temperature for 1 hour. A polyamidoamide acid (PAAA) having an intrinsic viscosity of 0.49 dl/g (0.5% in NMP, 25° C.) was obtained.

b) Production of a film from the polyamidoamide acid obtained according to Example 1a)

The polyamidoamide acid (PAAA) obtained according to Example 1a) was concentrated to 30% strength by weight in a Rotavapor, after which the polymer solution was applied to a cleaned glass plate with the aid of a film-drawing apparatus (0.5 mm gap height). Conversion of the PAAA into the polyamidoimide by means of heat was carried out, for example, in vacuo in accordance with the following temperature program: 16 hours at 50° C., 0.5 hour at 70° C., 0.5 hour at 90° C., 0.5 hour at 100° C., 0.5 hour at 120° C., 0.5 hour at 140° C., 0.5 hour at 150° C., 2 hours at 180° C., 0.5 hour at 200° C., 1 hour at 230° C., 1 hour at 240° C. and 1 hour at 250° C.

As was to be seen from the IR spectrum of the film, complete cyclization took place here. The thermal and mechanical properties are shown in Table 1.

c) Preparation of a pressing powder from the polyamidoamide acid obtained according to 1a).

To prepare a pressing powder, about 10 g of an approximately 20% strength by weight solution of the polyamidoamide acid obtained according to 1a) were added dropwise to 30 ml of a mixture of 3 parts by volume of pyridine and 2 parts by volume of acetic anhydride and the mixture was stirred at room temperature for 20 hours, a yellow gelatinous suspension precipitating. This was then added dropwise to a mixture of one part by volume each of water and methanol and the suspension formed was homogenized with a "Turrax" mixer. The yellow powder formed was filtered off with suction, washed thoroughly with methanol and dried to constant weight at 130° C. in a vacuum drying cabinet. According to the invention, the pyridine can also be omitted from this chemical cyclization without a noticeable impairment in the degree of imidization.

EXAMPLES 2 TO 4

Polyamidoamide acids (PAAA) and polyamidoimides (PAI) were obtained by working instructions analogous to those given in Example 1a to c, but instead of MDA, 2,4-toluylenediamine (TDA), 4,4-diaminodiphenyl sulfone (DS) or 4,4'-diaminodiphenyl ether (DAE) were used as diamines, with in some cases different reaction times. The properties of the PAAA and PAI obtained and the reaction times are summarized in Table 1.

EXAMPLE 5

Preparation of a polyamide acid (PAA) from the dianhydride XIII and 4,4'-methylenedianiline (MDA)

Batch:
1.6096 g (1.5 mmol) of dianhydride XIII
0.2974 g (1.5 mmol) of MDA
20 ml of absolute dimethylacetamide (DMA)
5 ml of absolute N-methyl-2-pyrrolidone (NMP)

The dianhydride XIII was dissolved in 10 ml of the solvent mixture of DMA and NMP in the apparatus described in Example 1a), the solution was cooled to 0° C. and a solution of MDA in 15 ml of the solvent mixture of DMA and NMP was added dropwise in the course of 15 minutes. After 30 minutes, the cooling was removed and the reaction mixture was stirred at room temperature for 20 hours. A polyamide acid having an intrinsic viscosity of 0.25 dl/g (0.5% in DMA, 25° C.) was obtained and was cyclized by means of heat or chemically analogously to Example 1 b or 1c to give the polyimide. The heat stability and the mechanical properties of the polyimide are shown in Table 1.

EXAMPLES 6 AND 7

The corresponding polyamide acids and polyimides were obtained from the dianhydride XIII and TDA or DAE in accordance with working instructions analogous to those given in Example 5. The properties are summarized in Table 1.

EXAMPLE 8

Preparation of an ordered polyimide from benzophenonetetracarboxylic acid dianhydride (BTDA), 1,4-bis(4-aminophenylthio)diphenyl sulfone (BDS) and 4,4'-methylenedianiline (MDA).

Batch:
3.2223 g (10 mmol) of BTDA
2.2070 g (4.75 mmol) of BDS
1.0410 g (5.25 mmol) of MDA
60 ml of absolute dimethylacetamide (DMA)

The BTDA was dissolved in 30 ml of DMA in the apparatus described in Example 1a), the solution was cooled to 0° C. and BDS, dissolved in 20 ml of DMA, was added dropwise in the course of 10 minutes. After 20 minutes, the cooling was removed and the reaction mixture was stirred at room temperature for 2 hours. The MDA, dissolved in 10 ml of DMA, was then added dropwise at 0° C. in the course of 10 minutes. After the mixture had been stirred at room temperature for 1 hour, a polyamide acid with an intrinsic viscosity of 0.53 dl/g (0.5% in DMA, 25° C.) was obtained and was cyclized by means of heat and chemically analogously to Example 1b) or 1c) to give the polyimide. The heat stability and the mechanical properties of the polyimide are shown in Table 1.

DAE in accordance with working instructions analogous to those given in Example 13.

TABLE 1

| | Dianhydride | | Dianine Reaction Time (h) | Visc. (dl/g) | Tg (°C.) | TGA (°C.) | Tensile Strength (MPa) | E modulus (MPa) | Elongation at break (%) |
|---|---|---|---|---|---|---|---|---|---|
| 1 | XII | MDA | 1 | 0,49 | 245 | 455 | 76 ± 13 | 3300 ± 300 | 5 ± 2 |
| 2 | XII | TDA | 15 | 0,40 | 280 | 455 | 69 ± 7 | 3200 ± 200 | 3 ± 1 |
| 3 | XII | DS | 50 | 0,20 | 250 | 460 | 83 ± 3 | 3300 ± 400 | 4 ± 1 |
| 4 | XII | DAE | 1 | 0,53 | 245 | 470 | 81 ± 19 | 3100 ± 100 | 5 ± 2 |
| 5 | XIII | MDA | 20 | 0,25 | 286 | 520 | 83 ± 6 | 3200 ± 200 | 6 ± 2 |
| 6 | XIII | TDA | 20 | 0,20 | 280 | 515 | 98 ± 7 | 2500 ± 200 | 4 ± 1 |
| 7 | XIII | DAE | 20 | 0,25 | 268 | 514 | 80 ± 5 | 1800 ± 200 | 6 ± 2 |
| 8 | BTDA + BDS | MDA | 1 | 0,53 | 275 | 520 | 99 ± 7 | 2500 ± 200 | 13 ± 5 |
| 9 | BTDA + BDS | TDA | 18 | 0,40 | 282 | 510 | 111 ± 4 | 2300 ± 100 | 8 ± 1 |
| 10 | BTDA + BDS | DS | 40 | 0,30 | 285 | 545 | 102 ± 6 | 2600 ± 400 | 4 ± 1 |
| 11 | BTDA + BDS | DAE | 1 | 0,44 | 245 | 518 | 88 ± 4 | 3100 ± 400 | 5 ± 1 |
| 12 | BTDA + BDS | PPD | 5 | 0,67 | 255 | 532 | 99 ± 13 | 2900 ± 500 | 5 ± 1 |
| 13 | XIV | MDA | 20 | 3,10 | 248 | 495 | 82 ± 7 | 2700 ± 400 | 3 ± 1 |
| 14 | XIV | DAE | 20 | 0,22 | 235 | 500 | 76 ± 5 | 3000 ± 600 | 4 ± 1 |

Abbreviations used in Table 1:
PAAA polyamidoamide acid
PAA polyamide acid
PAI polyamidoimide
PI polyimide
MDA 4,4'-methylenedianiline
TDA 2,4-toluylenediamine
DS 4,4-diaminodiphenyl sulfone
DAE 4,4'-diaminodiphenyl ether
PPD p-phenylenediamine
visc. intrinsic viscosity (0.5%, 25° C.)
Tg glass transition temperature
TGA thermogravimetric analysis

EXAMPLES 9 TO 12

The ordered polyamide acids and polyimides shown with their properties in Table 1 were obtained from BTDA, BDS and TDA or DS or DAE or p-phenylenediamine (PPD) in accordance with working instructions analogous to those shown in Example 8. The reaction times which differ from Example 8 are also shown in Table 1.

EXAMPLE 13

Preparation of a polyamide acid from the dianhydride XIV and 4,4'-methylenedianiline (MDA)

Batch:
1.2973 g (1.5 mmol) of dianhydride XIV
0.2974 g (1.5 mmol) of MDA
20 ml of absolute dimethylacetamide (DMA)
5 ml of absolute N-methyl-2-pyrrolidone (NMP)

The dianhydride XIV was dissolved in 10 ml of the solvent mixture of DMA and NMP in the apparatus described in Example 1a, the solution was cooled to 0° C. and a solution of MDA in 15 ml of the solvent mixture of DMA and NMP was added dropwise in the course of 15 minutes. After 30 minutes, the cooling was removed and the reaction mixture was stirred at room temperature for 20 hours. A polyamide acid having an intrinsic viscosity of 3.10 dl/g (0.5% in DMA, 25° C.) was obtained and was cyclized by means of heat and chemically analogously to Example 1b) or 1c) to give the polyimide. The high viscosity achieved was possible above all by using particularly pure starting substances.

The heat stability of the polyimide is shown in Table 1.

EXAMPLE 14

The polyamide acid and the polyimide shown in Table 1 were obtained from the dianhydride XIV and DAE in accordance with working instructions analogous to those given in Example 13.

We claim:
1. A soluble, fusible or both soluble and fusible polyimide or polyamidoimide of the formula I

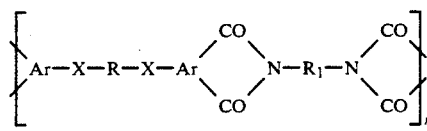

in which R denotes a divalent radical of the formula II

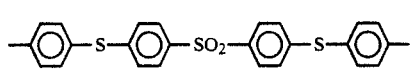

Ar denotes trivalent or tetravalent aromatic radicals, it being possible for the trivalent aromatic radical optionally to contain a carboxyl group as a substituent, X denotes the amide radical —CO—NH— if Ar is trivalent, and if Ar is tetravalent denotes the imide radical of the formula III

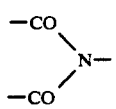

N in each case being bonded to R, $R_1$ denotes trivalent aromatic radicals of the formulae IV to VIII

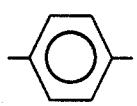

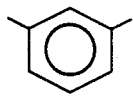 V

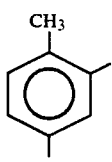 VI

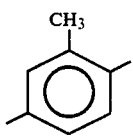 VII

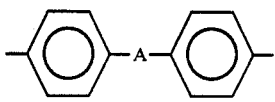 VIII or mixtures thereof, in which A stands for —CH$_2$—, —C(CH$_3$)$_2$—, —O—, —S—, —SO—, —SO$_2$—, —CO—, —COO—, —CO—NH—, —NH—, -(N-alkyl)— having 1 to 20 C atoms, -(N-aryl)- having 6 to 20 C atoms or —N=N—, and n denotes an integer from 2 to 200.

2. The polyamidoimide as claimed in claim 1, which contains both trivalent and tetravalent aromatic radicals Ar.

3. The polyimide as claimed in claim 1, in which the tetravalent radical Ar represents a benzophenone radical.

4. The polyimide or polyamidoimide as claimed in claim 1, in which the aromatic radical Ar represents a benzene radical.

5. A process for the preparation of a soluble, fusible or both soluble and fusible polyimide or polyamidoimide as claimed in claim 8, which comprises reacting tetracarboxylic acid or derivative thereof the formula IX

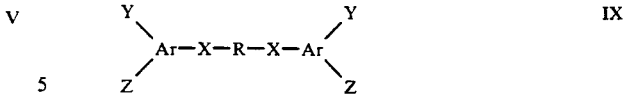 IX in which R, Ar and X have the abovementioned meaning and Y and Z either together denote the anhydride radical —CO—O—CO— or by themselves and independently of one another denote the radicals —COOH—, —COCl or —COOR$_2$, in which R$_2$ stands for an alkyl radical having 1 to 20 C atoms or for an aryl radical having 6 to 20 C atoms, with an aromatic diamine of the formula X

H$_2$N—R$_1$—NH$_2$      X in which R$_1$ has the abovementioned meaning, and the polyamide acid initially formed is subjected to cyclization chemically or by means of heat.

6. The process as claimed in claim 5, wherein a tetracarboxylic acid dianhydride is used as the tetracarboxylic acid derivative of the formula IX

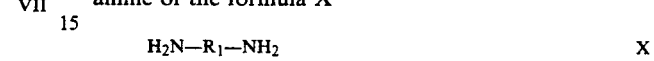 IX

7. The process as claimed in claim 5, wherein the tetracarboxylic acid or derivative thereof of the formula IX

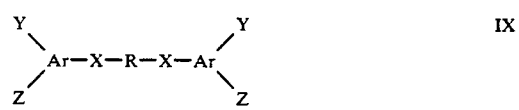 IX is reacted directly after being formed, without being isolated from the reaction mixture, with the aromatic diamine of the formula X

H$_2$N—R$_1$—NH$_2$      X and the amide acid initially formed is cyclized chemically or by means of heat.

* * * * *